March 12, 1963     R. E. STILWELL ETAL     3,080,881
SEQUENTIAL IRRIGATION VALVE
Filed Oct. 13, 1958     4 Sheets-Sheet 1
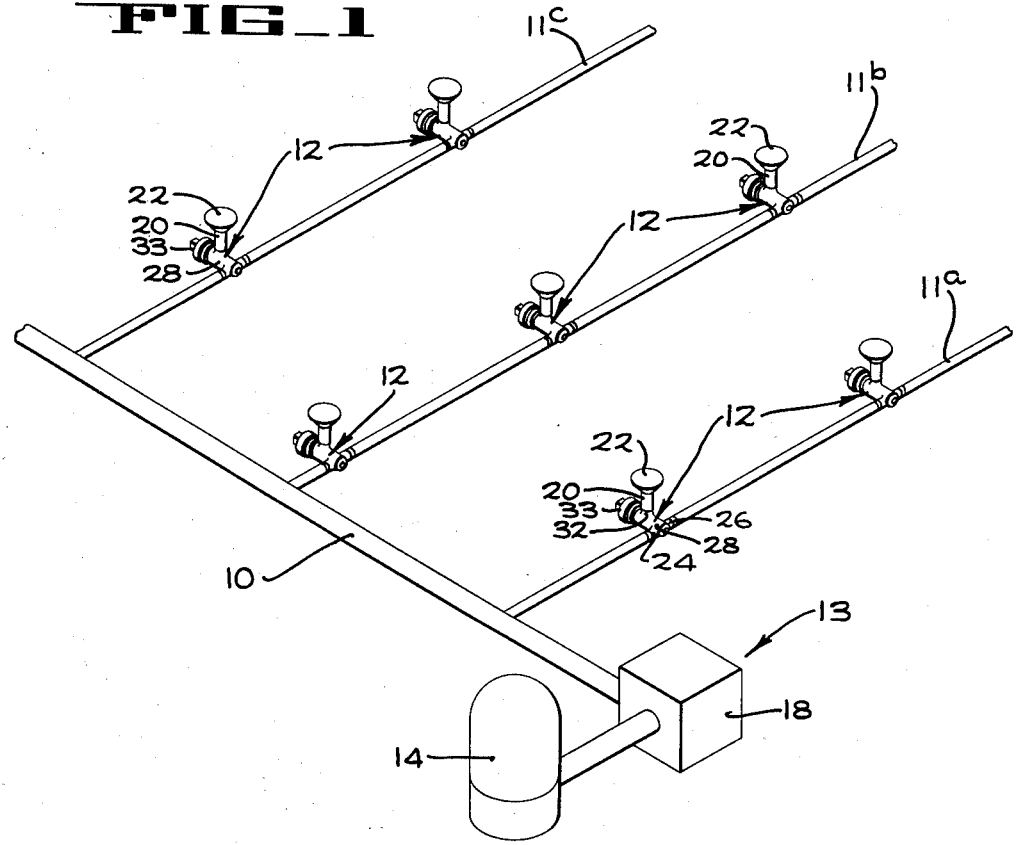
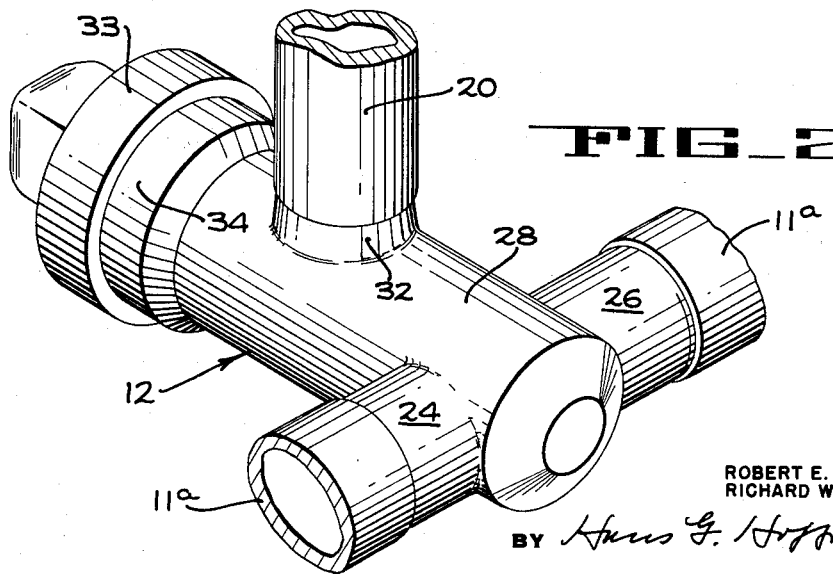
INVENTORS
ROBERT E. STILWELL
RICHARD W. FITZMAURICE
BY *Hans G. Hoffmeister*
ATTORNEY March 12, 1963 R. E. STILWELL ETAL 3,080,881
SEQUENTIAL IRRIGATION VALVE
Filed Oct. 13, 1958 4 Sheets-Sheet 2
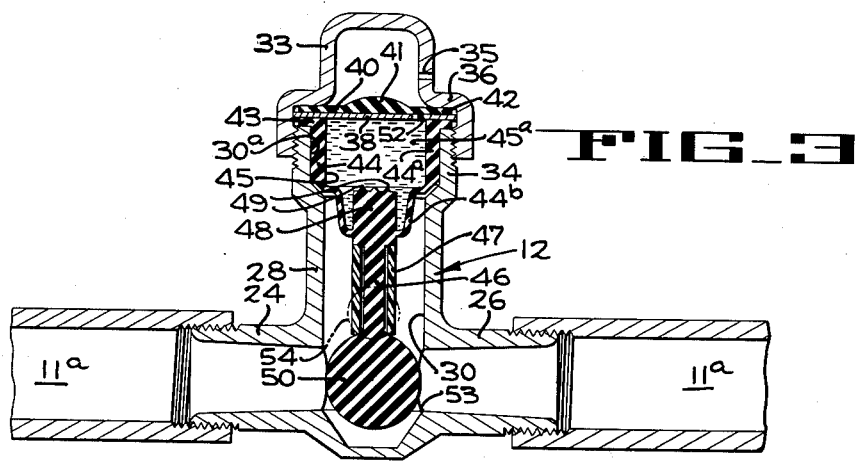
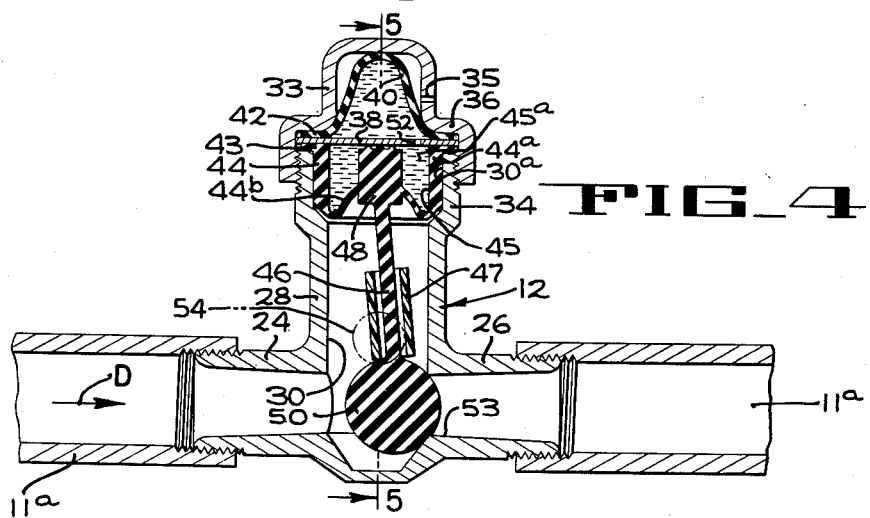
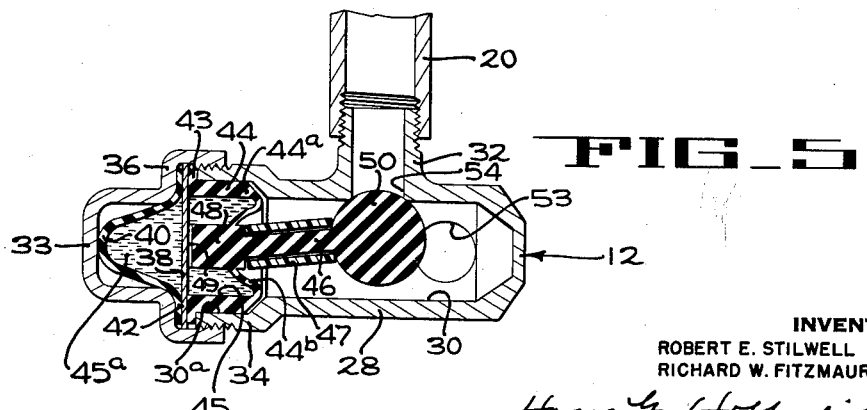
INVENTORS
ROBERT E. STILWELL
RICHARD W. FITZMAURICE
ATTORNEY

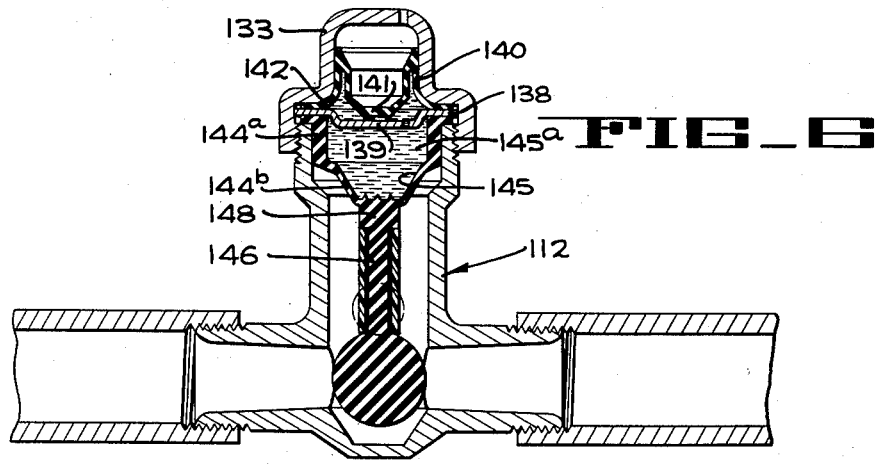
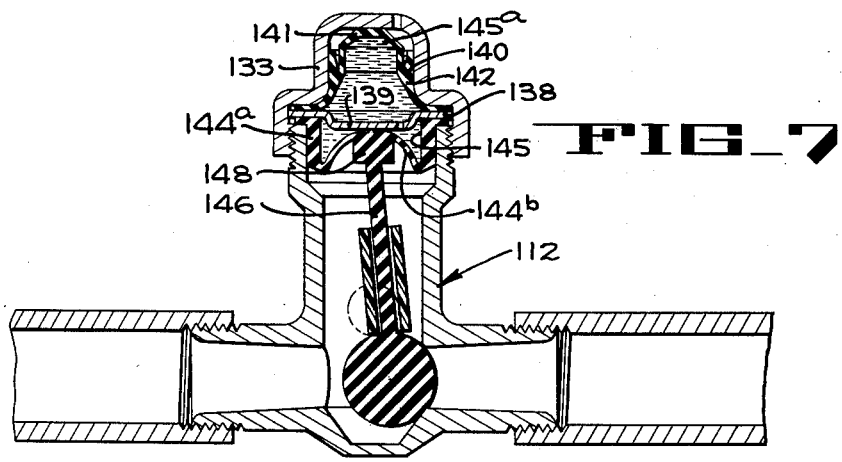
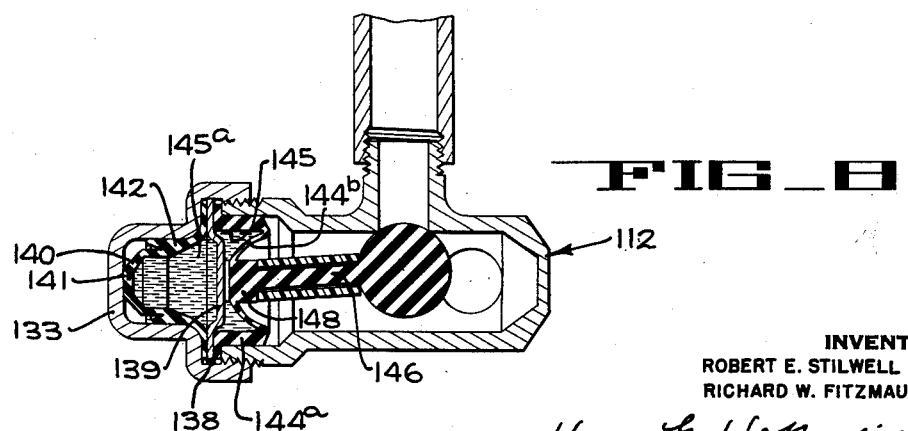
INVENTORS
ROBERT E. STILWELL
RICHARD W. FITZMAURICE

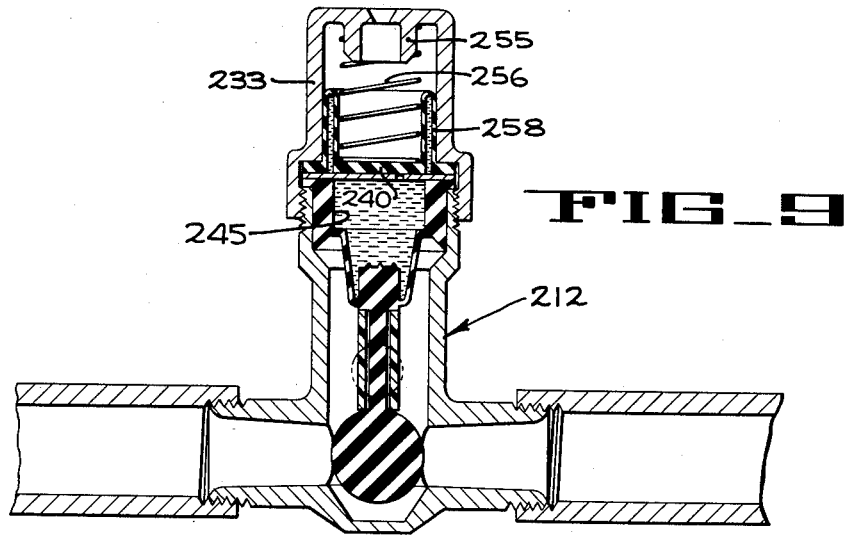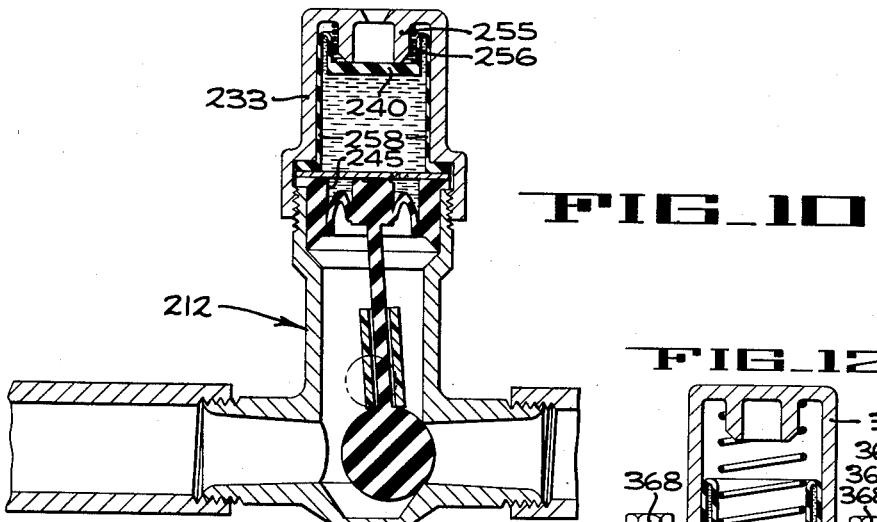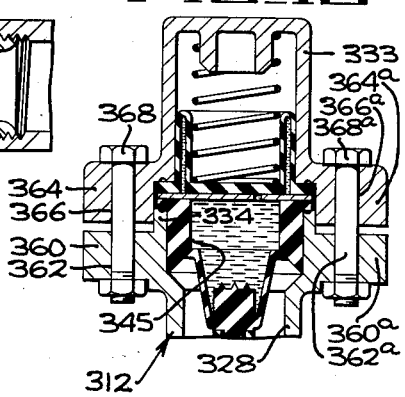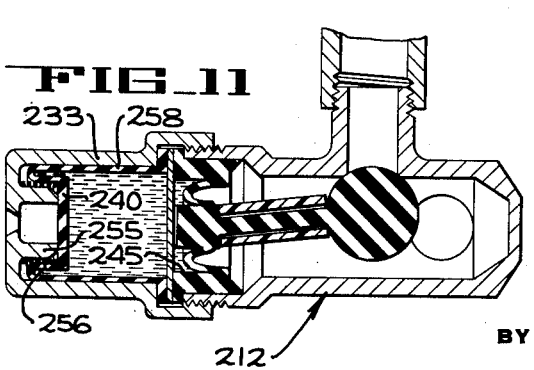

United States Patent Office 3,080,881
Patented Mar. 12, 1963

3,080,881
SEQUENTIAL IRRIGATION VALVE
Robert E. Stilwell and Richard W. Fitzmaurice, Santa Clara, Calif., assignors to FMC Corporation, a corporation of Delaware
Filed Oct. 13, 1958, Ser. No. 766,912
12 Claims. (Cl. 137—119)

The present invention relates to systems for the control of fluid flow, and more particularly to sequential irrigation systems in which the flow of irrigation water is controlled automatically.

Sequential irrigation systems are particularly effective in the irrigation of row crops. A system of this type usually includes a main pipe line which will transmit sufficient water to supply several branch pipe lines. The main pipe line is usually installed along one edge of the acreage that it is to serve. The plurality of branch pipe lines extend laterally from the main pipe line and between the rows of crops, and each of the lateral pipe lines is provided with a series of sprinkler heads. When an irrigation system of this type is in use, the sprinkler heads of each series are operated in succession, usually the sprinkler head in each lateral pipe line closest to the main pipe line being first operated, and the other sprinkler heads in each lateral line then being operated in turn, until the last in each branch line has been operated.

The use of sequential irrigation systems results in substantial savings in pipe line costs. It will be realized that if all of the sprinkler heads in a pipe line were to be operated simultaneously, a pipe line of quite large diameter and a correspondingly heavy flow of water would be necessary. However, when the sprinkler heads are operated sequentially, the pipe line need only be just large enough to transmit sufficient water for the operation of one sprinkler head at a time.

The use of sequential irrigation systems, however, has in the past entailed certain economic disadvantages. The cost of installing such systems has usually been great, in view of the large number of valves and sprinkler heads required. In addition, expensive valve structures including many moving parts have been required. Also, the maintenance costs of such systems have usually been high, due chiefly to clogging of the valves by solid particles present in the irrigation water. Finally, operating expenses have been high, as a consequence of the high pressure drop across each valve and the resultant high pumping pressures necessary.

It is, therefore, an object of the present invention to provide an improved sequential irrigation system.

Another object of the invention is to provide a sequential irrigation system whose installation and operating costs are minimized.

Another object of the present invention is to provide a sequential irrigation system which is particularly adapted for automatic control.

Another object of the invention is to provide an improved valve for sequential irrigation systems.

Another object of the present invention is to provide a valve of inexpensive construction for sequential irrigation systems.

Another object of the invention is to provide a valve for sequential irrigation systems, which combines simplicity of structure with high efficiency in operation.

Another object of the present invention is to provide a valve for sequential irrigation systems which is characterized by dependeble, trouble-free operation, and which therefore requires not more than a minimum of maintenance.

Another object of the invention is to provide a valve for sequential irrigation systems, which is automatically operated by a reduction in pressure of the water flowing through the pipe line in which the valve is installed.

Another object of the present invention is to provide in a sequential irrigation line a valve that interferes to only a minimum extent with flow therethrough, and which therefore causes only a minimum pressure drop thereacross.

Another object is to provide a sequence valve that is reversible, i.e., which will operate equally well regardless of the direction of flow therethrough.

These and other objects and advantages of the present invention will become apparent from the following description, read in conjunction with the accompanying drawings, in which:

FIG. 1 is a diagrammatic perspective of a portion of the sequential irrigation system of the present invention.

FIG. 2 is an enlarged perspective of one of the valve members employed in the irrigation system of the invention, portions of the pipe line being shown, and the sprinkler head connection being broken away.

FIG. 3 is a horizontal medial section through the valve member of FIG. 2, illustrating the idle position thereof.

FIG. 4 is a view similar to FIG. 3, illustrating a first operational position of the valve member.

FIG. 5 is a vertical section taken along the lines 5—5 of FIG. 4, showing a second operational position of the valve member.

FIGS. 6, 7 and 8 are views corresponding to FIGS. 3, 4 and 5, respectively, illustrating a modification of the valve member of the invention.

FIGS. 9, 10 and 11 are views corresponding to FIGS. 3, 4 and 5, respectively, illustrating a further modification of the valve member of the invention.

FIG. 12 is a fragmentary horizontal section, illustrating a still further modification of the valve member of the invention.

Referring to FIG. 1, a sequential irrigation system is shown in part. The system comprises a main pipe line 10, and a plurality of spaced, parallel lateral pipe lines 11a, 11b, 11c, etc. Located along each of the lateral pipe lines is a series of spaced sprinkler head support and valve members 12. Supply of water to the system is controlled by an automatic timing mechanism 13 which, according to the diagrammatic showing in FIG. 1, includes a pump 14 of conventional design and an automatically timed valve 18. The valve 18 is likewise of conventional design, and periodically effects a temporary reduction in the pressure of the water within the system. The valve 18 can be of a type that is clock-controlled and either completely shuts off the flow of water into the main line 10 or so reduces the rate of flow thereinto that the pressure within the system is reduced to the desired level. Alternatively, the valve 18 can be of a diverter type that directs the flow away from the pipe 10. Still another arrangement would dispense with the valve 18 and would include only an automatic timer and a pump that is shut down thereby during the periods when relief of pressure in the irrigation system is desired.

The positions of the members 12 along the lateral pipe lines may be staggered as illustrated in FIG. 1, or said members can be disposed in any other relative arrangement, as the circumstances of any specific installation may require.

A riser pipe 20 is connected to each of the members 12, and each riser pipe 20 is adapted to carry at its upper end a sprinkler head 22. The sprinkler heads 22 can be of any type appropriate to the individual circumstances and, therefore, do not require being specifically described. Inasmuch as the members 12 are all of like structure, only that member 12 closest to the main pipe line 10 along the lateral pipe line 11a will be described.

Referring to FIGS. 2 and 3, it will be seen that the member 12 comprises a hollow, T-shaped housing having a cross-bar portion formed of an inlet conduit 24 and an outlet conduit 26, which conduits adapt said member for connection into the lateral pipe line 11a. The riser pipe 20, which bears a sprinkler head 22, is connected to the stem portion 28 of the housing. Said stem portion provides a valve chamber 30 in communication with the inlet and outlet conduits 24 and 26, and having an outlet port in communication with a conduit 32 which threadedly receives at its outer end the riser pipe 20.

At its end opposite the conduits 24 and 26, the chamber 30 is closed by means of a cap 33 which is screwed onto the end 34 of the stem portion 28. The cap 33 is provided with an air bleed passage 35 through the wall thereof, and is formed with an annular shoulder 36, which serves to clamp between itself and the annular end face of said stem portion 28, a rigid circular plate 38, a diaphragm 40 in contact with the outer surface of said plate, and an annular flange 43 projecting radially outward from a wall 44. The diaphragm 40 is made of a suitable resiliently flexible material such as rubber and is of thickened construction at its central area 41, as compared to its peripheral area 42. The wall 44, which also is of flexible, resilient material, has a cylindrical outer portion 44a which lines a counterbore 30a at the outer end of the stem portion 28, and a thin walled inner portion 44b of reduced diameter sealing the inner end of the outer portion 44a. The wall 44 and the plate 38 together form a compartment or chamber 45 which contains a non-compressible, viscous fluid 45a such as a silicone base liquid.

The flexible wall member 44 is exposed to and responsive to water pressure within the valve housing or member 12, so that the chamber 45 formed by wall 44 and the orificed metering plate 38 can be considered to provide a pressure responsive control chamber. Hence wall 44 is a control chamber wall member. As to the diaphragm 40, although in the inactive condition of the valve shown in FIGURE 3 of the drawings, the diaphragm 40 lies against the metering plate 38, when water pressure in the housing urges the control chamber wall 44 toward the metering plate 38 (FIG. 4), the diaphragm 40 is distended and hence can be considered to cooperate with the metering plate 38 to form a reservoir chamber. Thus the diaphragm 40 is a reservoir wall member. The resilient construction of the diaphragm 40 urges it back toward the metering plate 38.

Extending into the chamber 30 from the wall portion 44b is a valve stem 46 of flexible, resilient material, and about which is disposed a cylindrical sleeve 47 constructed of rigid, corrosion-resistant material, such as nylon. The sleeve 47 may be split longitudinally along one side to facilitate its installation upon the stem 46. The outer end portion 48 of the stem 46 is enlarged, and extends a short distance into the chamber 45. The distal surface of end portion 48 is formed with a plurality of projections 49 having a purpose to be explained hereinbelow.

At the inner end of the stem 46 is mounted a ball valve 50, likewise constructed of rubber or other flexible and resilient material. Ball valve 50 serves as a valve closing member. The wall 44, stem 46 and ball valve 50 are preferably moulded as a single piece. Stem 46 serves as a resiliently deformable shifting member for valve ball 50, as will be explained in connection with the description of the operation of the device.

The plate 38 is provided with a restricted orifice 52, located intermediate the center and the circumferential edge thereof. It will be clear that as a consequence of the flexible and resilient construction of the wall 44 and the stem 46, the ball valve 50 can be shifted between its idle position (shown in FIG. 3), a first operative position (shown in FIG. 4) in which the valve 50 seats against and closes the outlet port 53 at the inner end of the outlet conduit 26, and a second operative position (shown in FIG. 5) in which the outlet port 54 at the inner end of the conduit 32 leading to the sprinkler head is closed.

Because of the flexible and resilient nature of the material employed for the ball valve 50, wear of the valve seat against which the valve 50 bears in closing the outlet port 53 is minimized. Furthermore, when said ball valve is seated, the surface of the yieldable ball valve 50 will be forced into tight engagement with the valve seat throughout the entire circumference thereof, even though it may be pitted or otherwise irregular, thus compensating for any wear that has occurred.

The symmetrical construction of the valve member 12 permits its installation in the line 11a in either of two positions. One of these positions is that shown in FIG. 1, in which the conduits 24 and 26 are at the inlet and outlet sides, respectively, of the valve member 12. In the other, or reversed position (not shown), the conduit 26 would be at the inlet side of the valve member, while the conduit 24 would be at the outlet side thereof. Thus, it is impossible to install the valve member 12 in a manner causing flow through the valve to be in the wrong direction.

When the irrigation system is not in operation, i.e, when there is no water passing through the pipe line 11a, the valve 50 is in its idle position shown in FIG. 3. Assuming the pump 14 to be in operation, and the control apparatus to be conditioned to supply water at full pressure to the main pipe line 10, water at full pressure will be supplied to all of the lateral lines 11a, 11b, 11c, etc. Since all of the lateral lines are of the same construction, the present disclosure will be restricted to a description of the lateral 11a. The water in the lateral 11a enters the member 12 closest to the main pipe line 10 through the inlet conduit 24, as indicated by the arrow D, and forces the respective ball valve 50 into its first operative position (FIG. 4), in which the port 53 leading to the outlet conduit 26 is closed. Thus the entire flow of water is directed through the conduit 32 and through the associated riser pipe 20 and sprinkler head 22. As a consequence, passage of water to any of the succeeding members 12 in the lateral pipe line 11a is prevented. At the same time, the water pressure in the first member 12 forces the liquid 45a from the chamber 45 through the orifice 52 in the plate 38 and against the diaphragm 40, thus distending the latter and causing it to bow outward from the plate 38. The air within the cap 33 escapes through the bleed hole 35. As a result, the stem 46 will be stretched into its position shown in FIG. 4, in which its end portion 48 is contact with the plate 38. The ball valve 50, however, will be maintained in its position closing the outlet port 53 due to the water pressure within the valve chamber.

After the sprinkler head 22 has been operated for a desired period of time, the timing apparatus 13 will effect a temporary drop in pressure in the main pipe line 10, and consequently in the lateral pipe line 11a. During this pressure drop, which might last for several seconds, the pressure on the ball valve 50 will be decreased, permitting the latter to be unseated by pull exerted by the stretched stem 46. The ball valve 50 will thus be moved into a position in which it is spaced by the sleeve 47 from the stem end portion 48, and is located directly below the conduit 32.

Before any appreciable amount of the liquid 45a which is distending the diaphragm 40 can trickle back through the orifice 52 into the chamber 45, the water pressure will again be raised in the system. The water flowing through the member 12 will then raise the ball valve 50 into the position shown in FIG. 5, in which the outlet port 54 leading to the conduit 32 is closed, whereupon the entire flow of water will pass straight through the first member 12 and on to the next member 12 in the lateral pipe line 11a to be discharged through the sprinkler head 22 associated with said next member 12.

Since the conduits 24 and 26 are in alignment with each other, as clearly shown in FIGS. 3 and 4, water follows a straight course in thus flowing through the valve member 12. Furthermore, when the ball valve 50 is in position to permit flow through the outlet conduit 26, the ball valve 50 is substantially removed from between the inlet and the outlet ports of the valve member 12, so that the ball presents substantially no interference with the smooth flow of water. Therefore, only minimum pressure drop occurs across each valve member 12.

Upon subsequent temporary drops in the pressure of water in the system the ball valves 50 in the successive members 12 in the line 11a will, in turn, be moved into positions corresponding to that shown in FIG. 5. A drop in line pressure for a period only sufficient to permit movement to such position by the ball valve 50 associated with the sprinkler that is operating at any given time will have no effect upon any ball valve which has previously been moved into such position, because such a period of time is too short for any substantial quantity of the liquid 45a to return through the restricted orifice 52.

When all of the sprinkler heads 22 in each of the lateral lines 11a, 11b, 11c, etc. have been operated, and all of the ball valves 50 have been moved into positions corresponding to that shown in FIG. 5, as above described, the water supply should be turned off completely. The fluid 45a distending the diaphragm 40 of each member 12 will then slowly be returned through the respective orifice 52 to the respective chamber 45. As a result, the diaphragm 40, wall 44, stem 46 and ball valve 50 will resume the position shown in FIG. 3. The projections 49 on the distal surface of each stem end portion 48 prevent possible suctional adherence of said end portion to the associated plate 38.

It is important to observe that the parts of the valve member 12 by which the liquid 45a is confined are hermetically sealed, and that the liquid 45a is, therefore, isolated from the water whose flow is controlled by the valve member 12, as well as from the ambient atmosphere. This prevents contamination of the liquid 45a by solid particles or algae that might interfere with passage of the liquid through the orifice 52.

When all of the valve members 12 have been caused to resume their original setting as above described, the system is in readiness for a subsequent cycle of operation. The timing mechanism 13 can be so designed that it can be set to automatically initiate the subsequent cycle of operation at any desired time after all of the valve members 12 have thus been placed in readiness.

It will be realized that, although an automatic mechanism has been shown for timing the pressure drops in the system, a manually operated valve could be employed for this purpose.

In the modification of the invention shown in FIGS. 6, 7 and 8, the structure of the member 112 is the same as that of the member 12 except for the differences now to be noted. A plate 138, corresponding to the plate 38 of the first described form of the invention, is formed with a central depression 139. The flexible and resilient diaphragm 140 is formed with a central portion 141 of U-shaped cross-section which at its base extends into the depression 139. The peripheral portion 142 of the diaphragm 140 is folded inward from the outer end of the portion 141, and conforms to the inner surface of the cap 133. The wall portion 144a is of lesser length and the wall portion 144b is of greater length than the corresponding wall portions 44a and 44b, respectively. The outer end portion 148 of the stem 146 does not extend into the chamber 145. The non-compressible fluid 145a is present not only in the chamber 145, but also in the space between the diaphragm 140 and the plate 138.

The operation of the member 112 is generally the same as that of the member 12. As the water pressure within the member 112 rises to normal irrigating pressure, the position and form of the diaphragm 140 will change from the FIG. 6 arrangement to that of FIG. 7, wherein the central portion 141 is turned inside out. When the diaphragm returns to its original form and position, the inside-out central portion 141 will tend to snap back to its normal form thus providing a special springing action as it approaches the plate 138, which aids in returning the fluid to the chamber 145.

In the modification of the invention shown in FIGS. 9, 10 and 11, the member 212 is of the same structure as the member 12 of FIGS. 3–5, with the exception of certain differences now to be pointed out. The cap 233 is deeper than the corresponding cap 33 of the member 12, and bears projecting inward from its outer end an inner boss 255 which mounts one end of a compression spring 256 which at its other end bears against the diaphragm 240. A portion 258 of the diaphragm 240 is folded upon itself and is disposed between the spring 256 and the side wall of the cap 233. The spring 256 serves to increase the pressure under which fluid is returned to the chamber 245, as compared to the pressure which would be exerted by the diaphragm 240 alone.

In the modification of the invention shown in FIG. 12, the member 312 is of the same structure as the member 212 of FIGS. 9–11, except for differences now to be noted. Instead of being provided with threads for securing the cap 333 in position, the end 334 of the stem portion 328 of the housing is provided with two outwardly projecting and oppositely disposed lugs 360 and 360a having slots 362 and 362a, respectively, opening in opposite directions. The cap 333 is likewise provided with two lugs 364 and 364a having slots 366 and 366a, which cooperate with the lugs 360 and 360a, respectively. Two bolts 368 and 368a passing through lugs 360, 364 and 360a, 364a, respectively, secure the cap 333 to the stem portion 328.

No air bleed passage is present in the cap 333. Therefore, in the operation of the valve member 312, the air within the cap 333 will be compressed upon distention of the diaphragm 340. The compressed air will provide an increase in pressure in addition to that provided by the spring 356 to effect return of the fluid by the diaphragm 340 to the chamber 345.

It will be appreciated that any of the hereinbelow described forms of the valve member of the invention can be constructed with a completely closed cap and/or with a bolted, rather than a threaded, interconnection between the cap and the stem portion of the housing, as illustrated in FIG. 12.

While particular embodiments of the present invention have been shown and described, it will be understood that further modifications can be made in the apparatus of the present without departing from the spirit of the invention and the scope of the appended claims.

Having thus described the invention what is claimed as new and desired to be protected by Letters Patent is:

1. A valve construction, comprising a housing having an inlet for admitting fluid under pressure and having a fluid outlet, a valve within said housing operatively associated with said fluid outlet, and valve actuating means within said housing and including a chamber having a first portion with a movable wall exposed to fluid in said housing, a second chamber portion having a movable wall open to the atmosphere, and an intermediate wall having a restricted orifice connecting said chamber portions, means connecting the movable wall of said first chamber portion to said valve, said connecting means accommodating motion of the wall with relation to the valve, liquid sealed within said chamber, and means responsive to fluid pressure in said housing for holding said valve at said outlet while said movable wall of said first chamber portion moves relatively to said valve to transfer fluid to said second chamber portion.

2. A pressure responsive valve for connection into a conduit comprising a housing having opposed inlet and outlet ports for connection respectively to the upstream and downstream sections of the conduit, a discharge port formed in said housing for connection to a discharge head, a valve member mounted in said housing, and valve member actuating means in said housing, said actuating means comprising a pressure responsive diaphragm, an extensible member connected to said diaphragm and to said valve member, said valve member being normally disposed in front of and spaced from said outlet port, introduction of water under pressure into said housing first moving said valve member into interlocked closing relation with said outlet port and next moving said diaphragm to stretch said extensible member, a subsequent decrease in water pressure in said housing releasing said valve member from said outlet port thereby causing said extensible member to withdraw the valve member from the outlet port and move it into a transfer position in front of the discharge port, the next increase in water pressure moving said valve member to close said discharge port and thereby interrupt flow to the associated discharge head, said valve member actuating means including time delay means for maintaining the valve member in said transfer position during successive temporary decreases in the water pressure within the valve housing.

3. A pressure responsive valve for connection into said conduit, said valve including a housing having conduit inlet and outlet ports at opposite sides of the housing, said housing also having a discharge port, a valve member mounted in said valve housing, and valve member actuating means in said housing including pressure responsive means and resilient means connected between said pressure responsive means and the valve member, said valve member moving into closing relation with said conduit outlet port in response to entry of water under pressure from said inlet port, said pressure responsive means moving in response to water pressure in the housing for stretching said resilient means thereby tending to withdraw the valve member from the conduit outlet port and shift it to the discharge port, said valve member forming an interlock with said outlet port in response to the pressure of water in said housing to maintain said valve member at said outlet port against the force of said resilient connecting means, said resilient connecting means shifting said valve member to a position adjacent the discharge port upon a decrease in water pressure in the housing, and said valve actuating means including means for maintaining said valve member at said discharge port upon subsequent temporary decrease in water pressure in the housing.

4. A pressure responsive valve for connection into a conduit, said valve including a housing having conduit inlet and outlet ports at opposite sides of the housing, said housing also having a discharge port, a valve member mounted in said valve housing and normally occupying a position spaced from said conduit outlet port, said valve member moving into closing relation with said conduit outlet port in response to entry of water under pressure from said inlet port, and valve actuating means including pressure responsive means and resilient means connected between said pressure responsive means and the valve member, said pressure responsive means moving in response to water pressure in the housing for stretching said resilient means thereby tending to withdraw the valve member from the conduit outlet port and shift it to the discharge port, said valve member forming an interlock with said outlet port in response to the pressure of water in said housing to maintain said valve member at said outlet port against the force of said resilient connecting means, said discharge port being displaced from said outlet port in a direction that is transverse of the line of flow between said inlet and outlet ports, said resilient connecting means acting in a direction normal to said line of flow, said resilient connecting means shifting said valve member to a position adjacent the discharge port upon a decrease in water pressure in the housing, and said valve actuating means including means for maintaining said valve member at said discharge port upon subsequent temporary decrease in water pressure in the housing.

5. An irrigation valve comprising a housing having a member defining a water inlet and a member defining a water outlet, said members having openings therethrough for permitting unobstructed flow of water therethrough, a member connected to said housing and defining a water discharge opening communicating with said water inlet and outlet and formed for connection to an irrigation head for said valve, a valve in said housing operable to close said water outlet or said water discharge opening alternatively, a valve actuating mechanism including a first and a second movable member cooperating to define therebetween a sealed fluid-containing chamber and a metering plate fixed in said housing and connected between said movable members, resiliently deformable valve shifting means connected to one of said movable members of said actuating mechanism, means for transmitting the force resulting from the deformation of said valve shifting means to said valve, and means for causing said actuating mechanism to deform said valve shifting means to a position for urging said valve toward said water discharge opening in response to the occurrence of a predetermined pressure in said housing.

6. A sequential irrigation valve comprising a housing having an inlet for admitting water under pressure and an outlet that provides for flow of water through the housing, said housing also having a water discharge opening communicating with said water inlet and outlet, a valve within said housing operable to close said water outlet or said water discharge opening alternatively, and valve actuating means within said housing, said valve actuating means including a sealed chamber having opposed movable wall portions separated by a fixed wall to form two chamber portions, said fixed wall having a metering orifice formed therein, a fixed volume of liquid sealed within said chamber, one wall portion of said chamber being exposed to water pressure in said housing, an extensible and contractible stem interconnecting said valve and said one movable wall portion, said stem being extended in response to movement of said one movable wall portion by water pressure in a direction that transfers liquid from the associated chamber portion, through the orifice in said fixed chamber wall and into said other chamber portion, extension of said stem tending to move said valve toward the water discharge opening, resilient means for moving said other movable wall portion to transfer liquid out of said other chamber portion, said orificed plate delaying liquid transfer between said chamber portions in response to the force of said resilient means in order that a momentary reduction of water pressure in said housing has substantially no effect on the position of the wall portions of said chamber.

7. A sequence valve comprising a housing having an inlet for admitting water under pressure and a water outlet for connection to the inlet of another sequence valve, said housing also having a water discharge opening, a valve within said housing operable to close said water outlet or said water discharge opening alternatively, and valve actuating means within said housing, said valve actuating means including a sealed chamber containing a liquid, one wall portion of said chamber being exposed to the pressure of water within the valve housing, said one wall portion being flexible and movable in response to increase in water pressure within said housing, means restricting movement of the liquid within the chamber to damp movement of the flexible wall, and resilient means connecting said valve to said one wall portion for shifting said valve from the water outlet to said discharge opening in response to a decrease in water pressure at said water inlet that follows a higher water pressure condition at the water inlet.

8. A sequence valve comprising a housing having an inlet for admitting liquid under pressure and having a liquid outlet port for connection to the inlet of another sequence valve, said housing also having a liquid discharge port, a valve within said housing for alternatively closing said liquid outlet port or said liquid discharge port, and valve actuating means within said housing, said valve actuating means including a chamber having a first portion with a movable wall exposed to liquid to said housing, a second chamber portion having a movable wall that is isolated from liquid in the housing, and an intermediate wall in said chamber having a restricted orifice connecting said chamber portions, means for connecting the movable wall of said first chamber portion to said valve, said connecting means accommodating motion of the wall with relation to the valve, a liquid sealed within said chamber, said valve and housing outlet port interfitting in response to liquid pressure in said housing for holding said valve at said outlet port while said movable wall of said first chamber portion moves relatively to said valve to transfer liquid to said second chamber portion, said motion accommodating means for connecting the valve and movable wall thereby urging the valve toward said liquid discharge port, said intermediate chamber wall comprising a plate, the wall of said second chamber portion being a diaphragm of flexible material, and means for resiliently urging said diaphragm toward said plate.

9. A valve construction comprising a housing having an inlet for admitting fluid under pressure and having a fluid outlet, a valve within said housing operatively associated with said fluid outlet, and valve actuating means within said housing and including a chamber having a first portion with a movable wall exposed to fluid in said housing, a second chamber portion having a movable wall, and an intermediate wall having a restricted orifice connecting said chamber portions, means connecting the movable wall of said first chamber portion to said valve, said connecting means accommodating motion of the wall with relation to the valve, liquid sealed within said chamber, and means responsive to fluid pressure in said housing for holding said valve at said outlet while said movable wall of said first chamber portion moves relatively to said valve to transfer liquid to said second chamber portion, said movable wall of said first chamber portion being of flexible material and being adapted to decrease and to increase the volume of said chamber in accordance with increases and decreases, respectively, of the fluid pressure within said housing, said intermediate wall comprising a plate, said movable wall of said second chamber portion being a diaphragm of flexible material and being resiliently urged toward and to a position adjacent said plate in response to decrease of the fluid pressure within said housing.

10. A valve construction comprising a housing having an inlet for admitting fluid under pressure and having a fluid outlet, a valve within said housing operatively associated with said fluid outlet, and valve actuating means within said housing and including a chamber having a first portion with a movable wall exposed to fluid in said housing, a second chamber portion having a movable wall isolated from fluid in said housing, and an intermediate wall in the form of a plate having a restricted orifice connecting said chamber portions, means connecting the movable wall of said first chamber portion to said valve, said connecting means accommodating motion of the wall with relation to the valve, a liquid within said chamber, and means responsive to fluid pressure in said housing for holding said valve at said outlet while said movable wall of said first chamber portion moves relatively to said valve to transfer liquid to said second chamber portion, the movable wall of said second chamber portion being a diaphragm that normally convexly faces said plate but is extended concavely away from said plate on transfer of fluid from said first to said second chamber portions.

11. An irrigation valve assembly comprising a housing having conduit portions for connecting the valve assembly into a conduit and a discharge portion for connection to a water discharge device, axially aligned, oppositely facing conduit valve seats communicating with said conduit portions, a discharge valve seat communicating with said discharge portion, said discharge valve seat being displaced from the axis of said conduit valve seats, a valve in said housing having oppositely facing seat portions for alternately engaging said conduit valve seats and a seat portion for engaging said discharge valve seat, means mounting said valve within said housing for motion in a direction away from either of said conduit valve seats and toward the other conduit valve seat in response to the flow of water into said housing, pressure responsive valve actuating means within said housing, resilient valve shifting means connected to said valve actuating means, means for transmitting the force resulting from deformation of said resilient valve shifting means to said valve for urging said valve from a position at one of said conduit valve seats into a position adjacent said discharge valve seat, and means for causing water pressure in said housing acting directly on said valve to releasably maintain said valve at either of said conduit valve seats against the force of said resilient valve shifting means.

12. An irrigation valve assembly comprising a housing having formed therein a water inlet, a water outlet, and a water discharge opening, said water discharge opening leading externally of said valve assembly for connection to an irrigation head, a valve movable in said housing for closing said water outlet or said water discharge opening alternatively, a valve actuating mechanism comprising an orificed metering plate fixed in said housing, a movable control chamber wall member exposed to water pressure in said housing and cooperating with said metering plate to form a pressure responsive control chamber, a movable reservoir wall member isolated from pressure in said housing and cooperating with said metering plate to form a reservoir chamber, and means for resiliently urging said reservoir wall member toward said metering plate, a liquid sealed in said chambers by said wall members, means for releasably retaining said valve in closing relation with said conduit outlet in response to the direct action of water pressure in said housing on the valve, and a resiliently deformable valve shifting member connected between said control chamber wall member and said valve, water pressure in said housing causing said control chamber wall member to transfer liquid from said control chamber to said reservoir chamber to thereby deform said valve shifting member, deformation of said valve shifting member urging the valve from said water outlet toward said water discharge opening, the water pressure in said housing also causing said valve retaining means to retain the valve in closing relation with said water outlet, temporary interruption of water pressure in said housing releasing said valve for motion toward said water discharge opening in response to the action of said valve shifting member.

References Cited in the file of this patent

UNITED STATES PATENTS

| | | |
|---|---|---|
| 1,593,125 | Jackley | July 20, 1926 |
| 1,609,578 | Scott | Dec. 7, 1926 |
| 1,745,536 | Gresham | Feb. 4, 1930 |
| 2,341,041 | Hauser | Feb. 8, 1944 |
| 2,369,731 | Forsbery | Feb. 20, 1945 |
| 2,579,334 | Plank | Dec. 18, 1951 |
| 2,663,539 | Kersten | Dec. 22, 1953 |
| 2,863,698 | Richards | Dec. 9, 1958 |
| 2,921,629 | Stout | Jan. 19, 1960 |
| 2,925,987 | Poiesmeyer | Feb. 23, 1960 |